United States Patent [19]

Saito et al.

[11] Patent Number: 5,145,510
[45] Date of Patent: Sep. 8, 1992

[54] SILICA GLASS POWDER AND A METHOD FOR ITS PRODUCTION AND A SILICA GLASS BODY PRODUCT MADE THEREOF

[75] Inventors: Shun Saito; Kazumi Kimura; Akira Utsunomiya, all of Kitakyushu, Japan

[73] Assignee: Mitsubishi Kasei Corporation, Tokyo, Japan

[21] Appl. No.: 754,963

[22] Filed: Sep. 4, 1991

[30] Foreign Application Priority Data

Sep. 7, 1990 [JP] Japan ................................. 2-238637

[51] Int. Cl.$^5$ ............................................. C03B 19/06
[52] U.S. Cl. ......................................... 65/18.1; 65/30.1; 65/32.1; 65/900; 65/901
[58] Field of Search .............. 65/18.1, 17, 30.1, 30.12, 65/32.1, 900, 901; 501/12

[56] References Cited

U.S. PATENT DOCUMENTS

| | | | |
|---|---|---|---|
| 4,105,427 | 8/1978 | Elmer | 65/900 X |
| 4,707,174 | 11/1987 | Johnson et al. | 65/18.1 |
| 4,767,433 | 8/1988 | Iura et al. | 65/901 X |
| 4,816,299 | 3/1989 | Alpha et al. | 65/17 X |

FOREIGN PATENT DOCUMENTS

2113200 8/1983 United Kingdom ................. 65/901

*Primary Examiner*—Robert L. Lindsay
*Attorney, Agent, or Firm*—Oblon, Spivak, McClelland, Maier and Neustadt

[57] ABSTRACT

A silica glass powder suitable for the production of a silica glass body product of a low silanol content, which is obtained by baking a dried silica gel powder obtained by a sol-gel method, at a temperature of from 1,000° to 1,400° C., wherein during the baking period, the silica gel powder is baked in a gas atmosphere containing from 10 to 100% by volume of steam for at least 5 hours.

17 Claims, No Drawings

SILICA GLASS POWDER AND A METHOD FOR ITS PRODUCTION AND A SILICA GLASS BODY PRODUCT MADE THEREOF

The present invention relates to a silica glass powder suitable as a starting material for a super purity silica glass product useful in the semiconductor field, and a method for its production and a silica glass body product made thereof.

Heretofore, a crucible or a jig used for the preparation of a semiconductor single crystal, was prepared by fusing a natural quartz powder obtained by pulverizing natural quartz. However, natural quartz contains various metal impurities even if it is of high quality, and thus was not fully satisfactory from the viewpoint of purity. Especially for a single crystal of high purity required reflecting the trend for high performance in the semiconductor industry, inclusion of metal impurities adversely affects the performance of semiconductors, and thus a crucible or jig which is likely to bring about inclusion of metal impurities, can not be used. For this reason, a synthetic high purity silica glass powder has been required recently.

In recent years, silica glass prepared by a sol-gel method using an alkoxy silane as the starting material has been introduced as a silica source excellent in the purity. For example, Japanese Unexamined Patent Publication No. 176928/1987 discloses a method for producing a silica glass powder which comprises preparing a gel by the hydrolysis of an alkoxy silane in the presence of an acid and alkali, pulverizing and drying the gel, followed by baking. However, a fused-shaped product of the conventional silica glass powder obtained by a sol-gel method has a high OH group concentration and has problems in the heat resistance and a decrease in the transparency due to formation of bubbles.

Therefore, it is necessary to reduce the OH group concentration in the fused-shaped product as far as possible. For this purpose, it has been considered important to adequately reduce the moisture content in the silica glass powder during the baking of the powder. For this purpose, it is preferred to conduct the baking of the silica glass powder in a dried gas atmosphere for a long period of time. However, even in such a case, it has been difficult to reduce the moisture content beyond a certain level.

Heretofore, in the case of glass for optical fibers, it has been proposed to conduct dehydration treatment which comprises treating with chlorine the silica glass powder after baking, followed by treatment with oxygen (Japanese Unexamined Patent Publications No. 37234/1981 and No. 104732/1981). However, the chlorine gas and the $SOCl_2$ gas used in this method are corrosive. Therefore, the material for e.g. the furnace is limited. Further, the OH groups in the silica glass powder are replaced by Cl, and consequently, Cl will be liberated during the fused-shaping, thus causing a bubble formation. Further, it has been proposed to change the silica to α-cristobalite during the baking thereby to reduce OH groups (Japanese Unexamined Patent Publication No. 166730/1988). However, the conversion rate of the silica to α-cristobalite is very slow, and a high temperature is required, whereby there is no suitable material available to prevent inclusion of impurities. Further, it has been proposed to add an alkali metal such as sodium in order to increase the conversion rate. However, in order to remove sodium, it is necessary to conduct alkali-removal treatment by subjecting the product in a chlorine gas at a high temperature for a long period of time. Such is not only economically disadvantageous, but also it is difficult to completely remove the alkali metal.

As other methods, (1) a method for producing a silica glass product by oxidizing silicon tetrachloride in an oxyhydrogen flame and (2) a method for producing a silica glass product by oxidizing silicon tetrachloride in a plasma flame, may, for example, be mentioned. However, according to method (1), the OH group content tends to be high, and chlorine tends to remain in an amount of a few hundreds ppm, whereby heat resistance tends to be poor. On the other hand, according to method (2), the OH group content may be low, but as in the case of method (1), chlorine tends to remain in an amount of a few hundreds ppm, whereby the heat resistance tends to be poor.

The present inventors have conducted extensive researches to obtain a silica glass powder free from the above-mentioned drawbacks, and as a result, have found that when a dried gel powder prepared by a sol-gel method, is baked in a gas containing steam at a certain concentration, while the OH group concentration of the resulting glass powder is not naturally very low, the OH group concentration in a shaped product obtainable by fused-shaping the obtained glass powder becomes surprisingly very low, and yet the formed glass body product is free from becoming opaque due to bubble-formation. The present invention has been accomplished on the basis of these discoveries.

According to the first aspect, the present invention provides a silica glass powder suitable for the production of a silica glass body product of a low silanol content, which is obtained by baking a dried silica gel powder obtained by a sol-gel method, at a temperature of from 1,000° to 1,400° C., wherein during the baking period, the silica gel powder is baked in a gas atmosphere containing from 10 to 100% by volume of steam for at least 5 hours.

According to the second aspect, the present invention provides a method for producing a silica glass powder suitable for the production of a silica glass body product of a low silanol content, which comprises baking a dried silica gel powder obtained by a sol-gel method, at a temperature of from 1,000° to 1,400° C., wherein during the baking period, the silica gel powder is baked in a gas atmosphere containing from 10 to 100% by volume of steam for at least 5 hours.

Further, according to the third aspect, the present invention provides a silica glass body product, which is obtained by baking a dried silica gel powder produced by a sol-gel method, followed by fusing, shaping and solidifying it, wherein the silica gel powder is baked in a gas atmosphere containing from 10 to 100% by volume of steam for at least a part of the baking period.

Now, the present invention will be described in detail with reference to the preferred embodiments.

The silica glass powder of the present invention is the one produced by subjecting a silica glass powder produced by a so-called sol-gel method which comprises hydrolyzing an alkoxy silane, followed by gelation of the hydrolyzate, to certain specific baking treatment according to the present invention.

The hydrolysis of an alkoxy silane by the sol-gel method is conducted by reacting the alkoxy silane with water in accordance with a well known method. As the alkoxy silane to be used as the starting material, a $C_{1-4}$ lower alkoxy silane such as tetramethoxysilane or tetraethoxysilane, or an oligomer thereof is preferred. The amount of water to be used, is selected usually within a range of from one equivalent to ten equivalent of the alkoxy groups in the alkoxy silane. At that time, an organic solvent such as an alcohol or an ether may be incorporated as the case requires. Such an alcohol may be methanol, ethanol, propanol or butanol, and such an ether may be acetone. Further, as the catalyst, an acid such as hydrochloric acid or acetic acid, or an alkali such as ammonia, may be used.

In order to obtain a silica glass powder or a silica glass body product of high purity, it is of course necessary that all the materials to be introduced into the reaction system, such as the starting material alkoxy silane, water and the solvent to be used here, are of high purity.

For the gelation of the hydrolyzate, it may simply be heated to readily obtain a gel. However, the hydrolyzate may be gelled in a few hours even when simply left to stand at room temperature. Therefore, the gelation time may be controlled by adjusting the degree of heating. The obtained gel may be pulverized before drying or may be dried before pulverization. The particle size of the dried silica gel powder is usually from 70 to 900 μm, preferably from 60 to 800 μm. The drying degree of the gel is usually from 1 to 10% by weight as represented by the water content. Such drying is conducted usually by heating the gel under vacuum or in an inert gas at a temperature of from 100° to 200° C. At that time, it is preferred to control the carbon content to a level of not higher than 0.2% in order to avoid a black residue of non-combustion carbon remaining in the silica glass body product and to suppress the formation of bubbles in the silica glass body product. The treatment to reduce the carbon content is preferably conducted by controlling the baking conditions, for example, by controlling the temperature raising rate to a level of not higher than 200° C./hr and conducting the baking in an oxygen-containing gas atmosphere.

The dried silica gel powder produced as described above, will then be baked under the following specific baking conditions.

Namely, for at least a part of the baking period, the baking is conducted in a gas containing from 10 to 100% by volume, preferably from 10 to 80% by volume, of steam. The baking in the steam-containing gas atmosphere of the present invention is conducted for at least 5 hours, preferably from 10 to 40 hours. If the steam concentration is too low, or the treating time is too short, no adequate effects of the present invention can be obtained.

The baking temperature of the dried gel powder is usually within a range of from 1,000° to 1,400° C., preferably from 1,000° to 1,300° C., more preferably from 1,100° to 1,250° C. If the temperature is too low, pores present in the dried gel will not disappear, whereby substantial glass body can not be obtained. On the other hand, if the temperature is too high, the silica glass powder tends to sinter, whereby the flowability will be impaired, and the subsequent treatment tends to be difficult.

The baking time is usually from 5 to 50 hours.

In the present invention, the baking in the steam-containing gas is conducted within the above baking time. However, it is usually preferred that after baking in the steam-containing gas, the baking is continued in a gas having a water content of not higher 3% by volume for at least one hour, preferably at least 3 hours.

There is no particular restriction as to the manner for controlling the amount of steam in the gas. It may be conducted by supplying steam into a baking vessel or generating steam in the baking vessel to bring the amount of the steam to the desired level. In the atmospheric air, moisture is contained only in an amount of about 1.5%. Therefore, a method may, for example, be employed, wherein the air is mixed with saturated steam of water heated in a closed vessel at various temperatures. Otherwise, it is possible to control the steam concentration in a waste gas obtained by burning a hydrogen-containing gas or a liquid fuel. In the latter case, it is necessary to pay a due care to avoid inclusion of impurities from the fuel.

With respect to the baking method, there is no particular restriction so long as the above-mentioned steam content can be maintained. A box-type furnace, a tunnel furnace, a kiln or a fluidized bed system may be employed. The amount of the steam-containing gas to be present is usually within a range of from 0.1 to 10 l/min per kg of the dried silica gel powder. It may be an atmosphere gas or may be a flow system.

There is no particular restriction as to the baking during the baking period other than the baking time in the above-mentioned steam-containing gas, and various atmosphere gases may be employed in accordance with known methods.

Among them, for the baking of a dried gel powder, it is advisable to conduct the baking treatment in an oxygen-containing gas atmosphere by controlling the baking conditions to avoid a black residue of non-combustion carbon remaining in the silica glass powder. At that time, it is effective to adjust the oxygen content to a level of at least 10%. Such baking treatment is conducted simultaneously with the above-mentioned baking in the steam-containing gas or separately therefrom, for example, during the temperature raising period at the initial stage of the baking. As an example of the case where such treatment is conducted simultaneously with the baking in the steam-containing gas, a gas comprising 14% of $O_2$, 30% of $H_2O$ and 56% of $N_2$ may be used.

The silica glass powder obtained by such baking usually has a OH group content of at least 300 ppm, particularly as much as from 500 to 3,000 ppm. However, in the silica glass body product obtained by vacuum fused-shaping of such a silica glass powder, the OH group content is found to be surprisingly low at a level of from 0 to a few ppm, whereby it is possible to obtain a transparent shaped product having excellent heat resistance and high viscosity at a high temperature and yet being free from bubbles.

The silica glass powder thereby obtained is of high purity and usually has a particle size of from 50 to 800 μm, preferably from 70 to 600 μm. For example, the total content of metal impurities such as Fe, Al, Ni, Na, etc. is not higher than 1 ppm, and the carbon content is not higher than 5 ppm.

The above silica glass powder may be fused-shaped by usual methods to obtain various silica glass body products. The formation of a silica glass body can be conducted by a suitable conventional method to form into a various shape such as a sheet-shape, a tubular-shape or an ingot shape, followed by solidification. As a fusing method of the silica glass powder, a vacuum fusion is usually employed, and the silica glass powder may be fused at a temperature of from 1,800° to 2,300°

C. for from 20 to 30 hours including the temperature raising period.

The baking and fusing of the dried gel powder can be conducted continuously or discontinuously i.e. the dried gel powder may be baked and cooled, and the obtained silica glass powder may then be fused under heating.

The microscopic structure of the silica glass powder thus obtained and the detailed mechanism for the decrease of the OH group concentration in the silica glass body product and consequential improvement in the heat resistance and transparency have not yet been fully understood. However, it is considered that in the silica glass powder of the present invention, many hydroxyl groups are present in a readily reactive structural disposition by the specific treatment, whereby it can be converted by the fused shaping to a silica glass body product having a low OH group content, having good heat resistance and excellent transparency and being free from turbidity.

The silica glass powder of the present invention is useful as a starting material for various super purity silica glass products for which high temperature strength is required and which are to be used in the field for the production of semiconductors, for example, as diffusion furnace tubes or jigs.

Now, the present invention will be described in detail with reference to Examples. However, it should be understood that the present invention is by no means restricted to such specific Examples.

EXAMPLE 1

Into an agitation tank, tetramethoxysilane and 2.5 times in equivalent of water were charged and stirred at a temperature of 30° C. for one hour to obtain a uniform sol solution by the hydrolytic reaction. The sol solution was transferred to a polyvinyl chloride vat and left to stand for 24 hours for gelation. The gel thereby obtained was dried for 12 hours in a vacuum drier at 140° C., and then the particle size was adjusted to from 100 to 500 μm. Two kg of this dried silica gel powder (water content: 10% by weight) was charged into a quartz vessel (200 mm×200 mm×150 mm) equipped with a cover and set in an electric furnace. An air containing 30% by volume of steam obtained by mixing an air with steam obtained by evaporating pure water, was introduced at a rate of 1 l/min per kg of the dried silica gel powder, and the temperature was raised to 1,200° C. at a rate of 200° C./hr and maintained at 1,200° C. for 20 hours. After cooling naturally, a silica glass powder (75–400 μm) containing 1,000 ppm of OH groups was obtained. This silica glass powder was packed in a molybdenum vessel of 100 mm in diameter×200 mm and introduced into a vacuum fusion furnace and fused over 30 hours at 1,800° C. under $1\times10^{-5}$ Torr. As a result, a transparent silica glass ingot having 1 ppm of OH groups was obtained. The total content of metal impurities in the silica glass powder and in the ingot was not higher than 0.08 ppm, and the carbon content was not higher than 5 ppm.

EXAMPLE 2

In Example 1, the baking was conducted at a temperature of 1,250° C. in a gas atmosphere containing 50% by volume of steam for 20 hours. The results are shown in Table 1.

EXAMPLE 3

In Example 1, the baking was conducted firstly at a temperature of 1,250° C. in a gas atmosphere containing 50% by volume of steam for 20 hours and then at the same temperature in a dry air containing 0.004% by volume of steam for further 20 hours. The results are shown in Table 1.

COMPARATIVE EXAMPLE 1

The baking was conducted in the same manner as in Example 1 except that the steam content during the baking was changed to 2% by volume, and after cooling, a silica glass powder containing 80 ppm of OH groups was obtained.

This silica glass powder was introduced into a vacuum fusion furnace and fused-shaped in the same manner as in Example 1. As a result, a bubble-formed silica glass ingot having 30 ppm of OH groups was obtained.

COMPARATIVE EXAMPLE 2

In Example 1, the baking time was changed to 3 hours. The results are shown in Table 1.

COMPARATIVE EXAMPLE 3

In Example 1, the baking in the gas atmosphere containing 30% by volume of steam was conducted for 1.5 hours, and then baking was continuously conducted at the same temperature in a gas atmosphere containing 2% by volume of steam for 18.5 hours. The results are shown in Table 1.

TABLE 1

| | Baking conditions | | | OH group concentration (ppm) | | Bubble- |
|---|---|---|---|---|---|---|
| No. | Steam concentration in a gas atmosphere (vol %) | Temperature (°C.) | Time (hr) | Glass powder | Glass ingot | forming |
| Example 1 | 30 | 1200 | 20 | 1000 | 1 | No |
| Example 2 | 50 | 1250 | 20 | 1100 | 1 | No |
| Example 3 | ①50 | 1250 | 20 | 80 | <1 | No |
|  | ②0.004 | 1250 | 20 |  |  |  |
| Comparative Example 1 | 2 | 1200 | 20 | 80 | 30 | Yes |
| Comparative Example 2 | 30 | 1200 | 3 | 1000 | 25 | Yes |
| Comparative Example 3 | ①30 | 1200 | 1.5 | 90 | 25 | Yes |
|  | ②2 | 1200 | 18.5 |  |  |  |

According to the present invention, a gas atmosphere having a high steam content is employed for the baking of a dried silica gel powder, whereby a silica glass powder having the OH group concentration not so reduced, is obtainable. However, when this silica glass powder is fused by a usual method such as a vacuum melting method to form a glass body product, it is possible to obtain a product having a very low water content with the OH group concentration (silanol concentration) being not higher than 1 ppm. Further, a glass body product having excellent transparency can be obtained without a bubble-forming phenomenon which is often a problem during the fused-shaping operation. Further, it is of course possible to obtain a high purity product containing no substantial amounts of metal impurities such as Fe, Al, Ni, Na, etc. and carbon content, since a purifiable hydrolyzate of a lower alkoxy silane is used as the starting material.

Accordingly, the silica glass powder and the silica glass body product of the present invention are useful particularly as a starting material for high purity silica glass products useful in the field of production of semiconductors, and as such products.

What is claimed is:

1. In a method for producing a silica glass powder suitable for the production of a silica glass body product of a low silanol content, which comprises baking a dried silica gel powder obtained by a sol-gel method, at a temperature of from 1,000° to 1,400° C., the improvement wherein during the baking period, the silica gel powder is baked in a gas atmosphere containing from 10 to 100% by volume of steam for at least 5 hours.

2. The method according to claim 1, wherein the OH group concentration of the silica glass powder is from 300 to 3,000 ppm.

3. The method according to claim 1, wherein the particle size of the silica glass powder is from 50 to 800 μm.

4. The method according to claim 1, wherein the total metal content in the silica glass powder is not higher than 1 ppm, and the carbon content is not higher than 5 ppm.

5. The method according to claim 1, wherein the water content of the dried silica gel powder is from 1 to 10% by weight.

6. The method according to claim 1, wherein the particle size of the dried silica gel powder is from 70 to 900 μm.

7. The method according to claim 1, wherein the dried silica gel powder is obtained by gelation of a sol formed by the hydrolysis of a lower alkoxy silane or its oligomer, followed by pulverization of the resulting gel.

8. The method according to claim 1, wherein the baking time is from 5 to 50 hours.

9. The method according to claim 1, wherein the baking temperature is from 1,100° to 1,300° C.

10. The method according to claim 1, wherein the steam concentration in the gas atmosphere is from 10 to 80% by volume.

11. The method according to claim 1, wherein the time for baking in the presence of steam is from 10 to 40 hours.

12. The method according to claim 1, wherein baking is continued for at least one hour after the baking in the steam-containing gas atmosphere.

13. The method according to claim 1, followed by fusing, shaping and solidifying the silica glass powder.

14. The method according to claim 13, wherein the OH group concentration in the silica glass body product is not higher than 10 ppm.

15. The method according to claim 13, wherein the total metal content in the silica glass body product is not more than 1 ppm, and the carbon content is not more than 5 ppm.

16. The method according to claim 13, wherein the silica glass body product is transparent and free from turbidity.

17. The method according to claim 13, wherein the temperature for the fusing treatment is from 1,800° to 2,300° C.

* * * * *